Feb. 12, 1935. J. G. KNIGHT 1,991,160
OUTLET OR JUNCTION BOX EXTENSION
Filed July 30, 1932

INVENTOR
J. G. Knight
BY
ATTORNEY

Patented Feb. 12, 1935

1,991,160

UNITED STATES PATENT OFFICE 1,991,160

OUTLET OR JUNCTION BOX EXTENSION

Julian Gordon Knight, Brooklyn, N. Y.

Application July 30, 1932, Serial No. 626,391

4 Claims. (Cl. 247—15)

The objects of this invention, considered broadly, are to provide simple, practical, inexpensive and easily installed means for enabling the extension of exposed conduit and the like from outlet boxes, junction boxes and similar structures.

The novel features of construction, combinations and relations of parts by which the foregoing and other desirable objects are attained, are set forth in the following specification, broadly covered in the claims and illustrated in the accompanying drawing.

Figure 1:
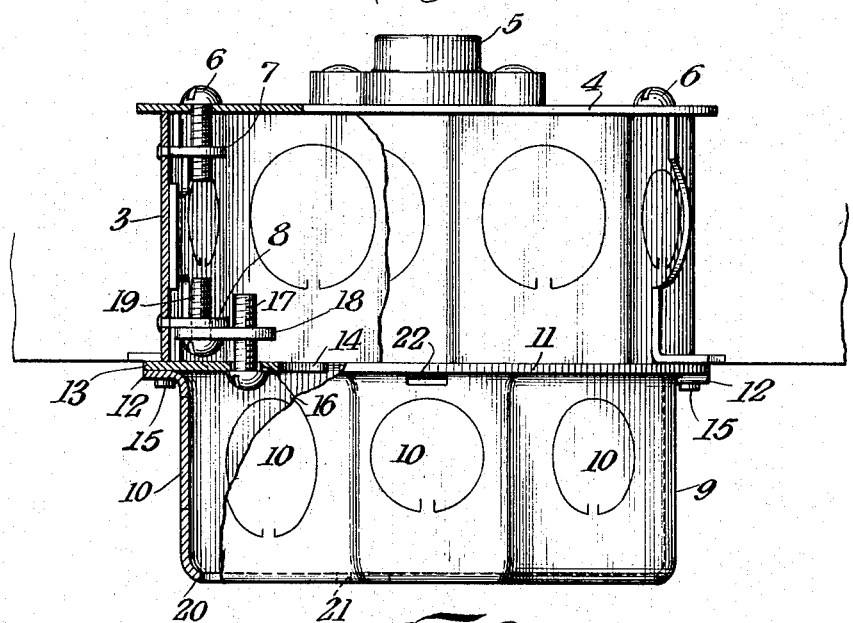

Fig. 1 in the drawing is a broken and partly sectional view illustrating an outlet box of standard construction, as embedded in a ceiling structure and showing the extension box adjustably secured thereto.

Figure 2:
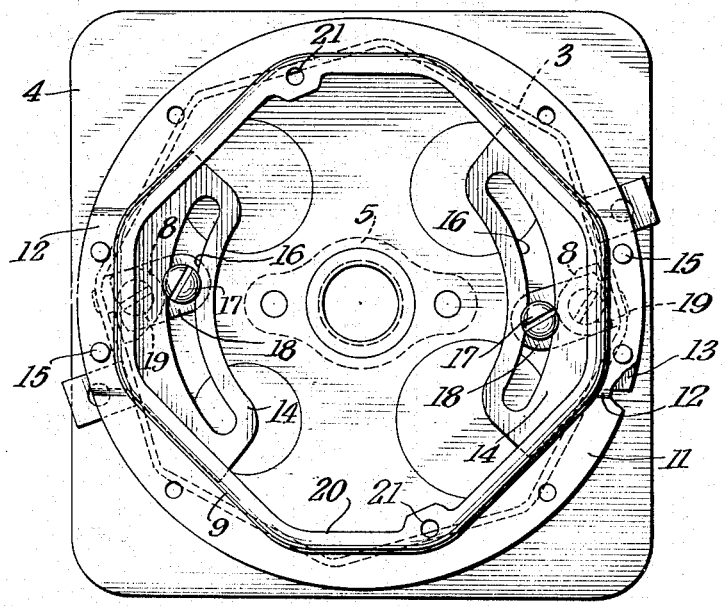

Fig. 2 is a bottom plan view of the combined structures.

The box which is embedded in the ceiling, wall or other structure, is shown as consisting of an annular side wall member 3, provided with knock-outs for the conduit carrying the wiring and having a back wall 4, carrying a fixture stud 5.

The back wall is removably secured in place by screws 6, engaged with screw lugs 7, inside the box carried by and projecting inwardly from the side wall 3.

Two sets of such screw lugs usually are provided, adjacent opposite edges of the side wall, the second set of such lugs, 8, ordinarily receiving screws for fastening in place a cover, ceiling plate, or the like.

Usually, outlet boxes of the type disclosed are of polygonal form, to enable the entry thereinto of different lines of conduit from different angles. For the same reason, it is desirable that the extension box be of similar outline.

In the illustration, the extension member which is designated 9, is of the shape generally similar to the side wall member 3 of the outlet box, and like that, is provided with knock-outs designated 10, in the several angularly related side portions of the same.

As the exposed wiring which is to be connected with the box extension may have to be run at quite different angles from the conduit entered in the box, it is desirable that such extension be secured in angularly adjustable relation and further, that in effecting such angular adjustments, no gaps be left between the side wall members 3 and 9, where the angularly related sides of the same be out of alignment. The latter condition is indicated in Fig. 2, where the dotted lines show the polygonal sides of the box wall 3, out of line with the polygonal sides of the extension 9. To cover the breaks or gaps, which would thus be otherwise left between the two box wall members, the lower or extension member 9 is provided at its upper edge with an outwardly extending flange 11, shown as of circular outline and as of sufficient extent to fully cover the lower edges of the main box wall in all positions of relative angularity.

This cover flange 11 is also utilized in the present disclosure as a part of the means for adjustably securing the extension in place. For such purpose, it is formed with depressions 12, at diametrically opposite points to receive the outwardly extending reduced neck parts 13 of the attaching plates 14, said reduced portions being secured in said seats by welding or rivets 15, or equivalent fastening means.

The portions of the supporting plates 14, which extend within the outline of the extension wall are shown as arcuately slotted at 16, concentric to the box center to receive the screws 17, which are projected upwardly therethrough into extension lugs 18, secured by screws 19, to the lower set of screw lugs 8 on the main box wall.

It will be seen that the screw lugs 18 attached as they are to the rigid screw lugs 8, form extensions of the latter and can be swivelled one way or the other, on their attaching screws 19, to effect lateral shifting adjustments of the extension wall relative to the main wall of the box. These lateral shifting adjustments moreover, do not conflict with the rotary adjustments of the box extension. Consequently, the extension may be bodily shifted laterally of the outlet box and also rotated one way or the other, so as to meet practically any installation requirements, the cover flange 11, being "overly" wide to permit of all such adjustments as might ordinarily be required.

The extension wall is shown as flanged inwardly at the bottom, at 20, to provide a seat for a suitable cover, canopy or the like, and as having screw seats 21 therein for screws which may be required for fastening such a cover or device in place.

To prevent condensation of moisture in the box extension, the same may have a vent opening or openings 22 therein, preferably in the form of a narrow slot or slots adjacent the ceiling level, as indicated in Fig. 1.

The invention it will be seen, provides a quickly installed and convenient means for connecting exposed wiring to an ordinary outlet box or the like, adapted to meet all ordinary wiring requirements and in a strong, rigid form, which is of no greater outside dimensions than the box itself and which will cooperate with the fittings, such as cover plates, canopies and the like, ordinarily connected with the box.

What is claimed is:

1. As a new article of manufacture, a polygonal sided outlet box extension, having an outstanding flange at one edge and inwardly projecting supporting plates with arcuate slots therein seated flush in said outstanding flange.

2. As a new article of manufacture, a polygonal sided outlet box extension having an outwardly projecting flange at one edge and a vent opening immediately adjoining said flange.

3. As a new article of manufacture, an outlet box extension wall having an outwardly projecting flange at one edge and inwardly projecting supports in the same plane with said flange.

4. As a new article of manufacture, an outlet box extension wall having an outwardly projecting flange at one edge and inwardly projecting supports in the same plane with said flange and including plates secured to said flange, said flange having depressions forming seats receiving portions of said plates, to thereby maintain said plates in the general plane of the flange.

JULIAN GORDON KNIGHT.